Patented Feb. 20, 1945

2,369,682

UNITED STATES PATENT OFFICE 2,369,682

STABILIZING SOIL

Abraham B. Miller, deceased, late of Newark, Del., by Hazel E. Miller, administratrix, Newark, Del., assignor to Hercules Powder Company, Wilmington, Del., a corporation of Delaware No Drawing. Application June 18, 1943, Serial No. 491,380

10 Claims. (Cl. 94—19)

This invention relates to the stabilization of soils, and more particularly to the stabilization of road soils and the like by the addition of a small amount of sodium acid abietate.

Soil stabilization is a treatment of soils to correct the natural deficiencies thereof and to render them more suitable for use as road building materials or the like. For example, in the case of some soils, poor load bearing qualities may be improved. In the case of other soils which have poor moisture resistance, they may be stabilized to prevent rutting, frost heaving, and other phenomena associated with weakening by water.

It has been proposed to prepare stabilized soils for use in road building by blending soils of various particle sizes and physical and chemical properties. For example, a soil which is hard and resists the abrasive and impact action of traffic may be blended with a soil which may provide for interlocking of the soil grains and thereby effect an increase in sheer strength. Clay-like materials might be added to absorb water and maintain stability in dry weather. Silt may also be desired to act as a filler and to provide a capillary bond in the presence of water when the clay becomes weak by losing cohesion in wet weather. Cementitious materials, such as, bitumen and Portland cement may also be added to soils which are deficient in binder, said cementitious material serving as a binder for the soil particles. While such stabilized soil blends have met with some measure of success, they are highly disadvantageous in that their preparation requires grading and blending of an enormous volume of materials and may often require transporting the different soil ingredients to widely separated localities.

It has also been proposed to stabilize soils through the addition of deliquescent materials, such as calcium chloride, to prevent dusting and to prevent the roads from becoming muddy in wet weather. Also, water-soluble binders, such as sulphite liquor concentrate and distillery waste, have been proposed. The use of such materials, however, is disadvantageous in that at best they provide only temporary stabilization.

Now, in accordance with the present invention, it has been found that low grade soils may be advantageously stabilized by mixing with them a small amount of sodium acid abietate. The soils may or may not be blended first with aggregate or fines to increase their strength and serviceability, and, if desired, the sodium acid abietate may be used in combination with other stabilizing agents. Soils stabilized according to the method of the invention are readily prepared, requiring a minimum amount of handling and transportation of materials, and remain stabilized over long periods of time. They are suitable for use in the construction of dams, levees, embankments, etc.; in packing underground pipe lines, conduits, foundations, and the like; and in constructing roads, airports, race tracks, tennis courts, playing fields, etc.

The material herein defined by the term "sodium acid abietate" is obtained by removing abietic acid from rosin by dissolving the rosin in alcohol, adding an alkali in amount sufficient to form sodium tetraabietate or sodium acid abietate. This sodium acid abietate consists of one molecule of sodium abietate loosely combined in the crystal form with three molecules of abietic acid, and is relatively insoluble in most pure solvents such as water, gasoline, alcohol, acetone, etc. Crystals which form in rosin sizes, usually referred to as 3:1 salts, consist essentially of sodium acid abietate.

A method of producing sodium acid abietate is as follows: Three hundred parts of K wood rosin (M. P. 82–82.5° drop method) were dissolved in 400 parts of ethyl alcohol. Fifteen parts of a 40% solution of NaOH were added slowly with rapid agitation. Crystals of sodium acid abietate begin to form within ½ hour and soon a thick slurry resulted. After four hours of stirring, the slurry was filtered. The precipitate was washed twice with alcohol which removed most of the occluded rosin solution. One hundred eight parts of pure white crystals of sodium acid abietate were obtained.

The soils which may be stabilized according to the invention include silts, clays, and mixtures thereof, or mixtures of silt and/or clays with cinders, pebbles, aggregates, or any other materials which by mechanical or other treatments can be made suitable for use for the purposes mentioned above. The invention also contemplates rendering soils water-resistant, which soils are deficient in binder. The binder may be added subsequent to the incorporation of the sodium acid abietate. In this manner the sodium acid abietate functions as a water-repellent constituent and in the event of precipitation causes a quick run-off with a minimum of moisture absorption. Binder materials, such as bitumen can thereafter be applied after a brief period of aeration. If the sodium acid abietate is not incorporated with the soil and precipitation does occur, the period of aeration is greatly extended and accordingly, the construction schedule is prolonged. In addition, the sodium acid abietate serves as a construction expedient when incorporated in any soils which are to be treated with a surfacing material which requires substantially dry conditions before the surfacing material can be applied.

In practicing the invention from about 0.05 to about 2.0% of sodium acid abietate, based on the dry weight of the soil, is thoroughly mixed with the soil, but preferably from about 0.1 to about 0.5%. The average quantity which has been found suitable for a great variety of soils is in the order of 0.2%. However, the percentage of sodium acid abietate may be varied according to the nature of the soil, some soils requiring more of the material than others to attain desired stabilization. Also, in the event the sodium acid abietate is employed primarily as a construction expedient the amount of the material may be greatly reduced. Quantities in the order of 0.05% have been found suitable for this purpose. The sodium acid abietate is incorporated in the soil in pulverulent form, the major portion of which is adapted to pass a screen in the order of 200 mesh. The addition of sodium acid abietate to the soil may be carried out in a number of ways, the most convenient of which depends upon the particular type of soil and the conditions under which the operation is carried out. For example, the soil may first be graded or blended in the customary manner and the sodium acid abietate mixed therewith prior to use. In stabilizing roads already constructed, the surface layer of the road may be scarified or plowed and the sodium acid abietate mixed in by harrowing or blading after which the road may be rolled and the surface compacted. Roads which are subjected to heavy traffic should then be given a wearing course of asphalt and aggregate or other suitable wearing surface material.

A summary of the results obtained in treating numerous soils with varying percentages of sodium acid abietate is given in the following table. In this table the designation "P. R. A. classification" refers to Public Roads Administration classification of the soils; the term "optimum moisture" refers to optimum moisture of the soil as determined by standard equipment (see A. S. T. M. Designation: D558-40T); the other terms used in the table are self-explanatory.

at which a soil can be most easily compacted to maximum density which in turn is necessary for obtaining the most stable condition for the soil; and it being further understood that when soil is saturated with water, the binder constituent not only has the voids between the particles filled with water, but the thickness of the water film on the particles is so great in relation to the size of the particles that the particles can no longer come into contact through the water and, consequently, a water-lubricated mass exists.

In the table, soils 1 through 4, containing 0.1–0.6% sodium acid abietate, and an initial moisture content of 6.6%, after 14 days' submersion approximated or was less than optimum moisture. Soils 5 through 12, containing 0.1–0.6% sodium acid abietate, and an initial moisture content of 0%, after nine days' submersion were all less than optimum moisture; while those soils having a high initial moisture content of 9.6% were maintained within range of moisture to afford suitable stability. Soils 13 through 15, containing 0.2–1.0% sodium acid abietate, and an initial moisture content of 6.1%, after 14 days' submersion approximated optimum moisture.

The advantages of sodium acid abietate over prior art stabilizers are numerous. Sodium acid abietate stabilizes soil by making it water-repellent. The only requirement is that the pulverized sodium acid abietate be thoroughly mixed with the soil. Maximum resistance to water either by precipitation or capillary action is obtained when the treated soil is compacted in accordance with standard highway procedure. Sodium acid abietate is effective in very small quantities. Satisfactory water-repellency is produced in some soils with as little as 0.05% based on the dry weight of the soil, and the average quantity required is about 0.2%. Seldom is more than 0.5% required. These very small quantities of stabilizing agents are of particular advantage in connection with military operations wherein it is necessary to transport stabilizing agents by means of aircraft. It is used as the dry powder and does not require the addition of water or chemical solutions to produce efficient results. This is of particular importance when the soil moisture is high as the addition of more water or chemical solution makes the soil unworkable. It Table

| Soil No. | P. R. A. classification | Optimum moisture | Stabilizer sodium acid abietate, per cent by weight | Per cent moisture when submerged | Per cent moisture after being submerged in water | | | |
|---|---|---|---|---|---|---|---|---|
| | | | | | 1 day | 7 days | 9 days | 14 days |
| 1 | A4-6 | 12.0 | 0.1 | 6.6 | -------- | 11.1 | -------- | 11.8 |
| 2 | A4-6 | 12.0 | 0.2 | 6.6 | -------- | 11.8 | -------- | 12.1 |
| 3 | A4-6 | 12.0 | 0.4 | 6.6 | -------- | 11.3 | -------- | 11.5 |
| 4 | A4-6 | 12.0 | 0.6 | 6.6 | -------- | 10.5 | -------- | 10.8 |
| 5 | A4-6 | 17.5 | 0.1 | 0 | -------- | -------- | 17.2 | -------- |
| 6 | A4-6 | 17.5 | 0.1 | 9.6 | -------- | -------- | 21.6 | -------- |
| 7 | A4-6 | 17.5 | 0.2 | 0 | -------- | -------- | 14.5 | -------- |
| 8 | A-46 | 17.5 | 0.2 | 9.6 | -------- | -------- | 20.6 | -------- |
| 9 | A4-6 | 17.5 | 0.4 | 0 | -------- | -------- | 13.5 | -------- |
| 10 | A4-6 | 17.5 | 0.4 | 9.6 | -------- | -------- | 18.8 | -------- |
| 11 | A4-6 | 17.5 | 0.6 | 0 | -------- | -------- | 10.6 | -------- |
| 12 | A4-6 | 17.5 | 0.6 | 9.6 | -------- | -------- | 19.4 | -------- |
| 13 | A2-6 | 11.0 | 0.2 | 6.1 | 10.0 | 11.1 | -------- | 11.8 |
| 14 | A2-6 | 11.0 | 0.6 | 6.1 | 9.7 | 11.5 | -------- | 11.8 |
| 15 | A2-6 | 11.0 | 1.0 | 6.1 | 10.3 | 12.0 | -------- | 12.6 |

With reference to the above table, the very excellent stabilizing qualities of sodium acid abietate can be seen; it being understood that the optimum moisture is the moisture content is effective at all moisture contents ranging from 0 to optimum, and even above, and does not require drying to a low moisture content to produce water-repellency. It is effective on a wide range of soils and soils treated with sodium acid abietate are sufficiently water-proof to withstand long periods submerged in water without taking on excessive moisture. This is of great value where the sub-soil is poor or the drainage is not good. Soils treated with sodium acid abietate will effectively prevent the penetration of surface water by precipitation or other means, but it will not retard the evaporation of moisture vapor from the soil. This fact makes it of great value as a construction expedient during periods of frequent precipitation or under construction conditions wherein it is necessary that the soil be in a substantially dry condition for the application of a surface course.

This application is a continuation-in-part of my application for U. S. Letters Patent, Serial No. 442,542, filed May 11, 1942.

What is claimed and desired to protect by Letters Patent is:

1. A stabilized soil having dispersed therein sodium acid abietate.
2. A stabilized soil having dispersed therein from about 0.05 to about 2.0% sodium acid abietate.
3. A water-resistant composition comprising soil and a minor proportion of sodium acid abietate in pulverulent form.
4. A water-resistant composition comprising soil and from about 0.05 to about 2.0% sodium acid abietate in pulverulent form.
5. A substantially water-resistant structural material comprising mineral aggregate, a binder for said aggregate, and a minor proportion of sodium acid abietate.
6. A substantially water-resistant structural material comprising mineral aggregate, a binder for said aggregate, and from about 0.05 to about 2.0% sodium acid abietate in pulverulent form.
7. A method of stabilizing soil which comprises thoroughly mixing therewith a minor amount of sodium acid abietate in pulverulent form.
8. A method of stabilizing soil which comprises thoroughly mixing therewith from about 0.05 to about 2.0% sodium acid abietate in pulverulent form.
9. In the art of building roads and the like, wherein a bituminous material is incorporated as a binder for unstable soil, the step which comprises treating the soil, prior to incorporation of said bituminous material, with sodium acid abietate in pulverulent form.
10. A method of producing a substantially water-resistant structural material which comprises thoroughly mixing a mineral aggregate, a binder for said aggregate, and a minor amount of sodium acid abietate in pulverulent form.

HAZEL E. MILLER,
*Administratrix of the Estate of Abraham B. Miller, Deceased.*